United States Patent [19]

Wright

[11] 3,964,172
[45] June 22, 1976

[54] CALIBRATION SHAFT ASSEMBLY FOR ENGINE VALVE ADJUSTMENT

[76] Inventor: Thomas H. Wright, 4249 SW. 62nd Ave., Miami, Fla. 33155

[22] Filed: May 30, 1975

[21] Appl. No.: 582,171

[52] U.S. Cl. ........................... 33/181 AT; 33/169 B
[51] Int. Cl.² ............................................ G01B 5/14
[58] Field of Search ..... 33/180 AT, 181 AT, 169 B, 33/172 R, 172 A

[56] References Cited
UNITED STATES PATENTS

| | | | |
|---|---|---|---|
| 2,117,854 | 5/1938 | Price | 33/181 AT X |
| 2,155,562 | 4/1939 | Price | 33/181 AT |
| 3,829,979 | 8/1974 | Stewart | 33/180 AT |

*Primary Examiner*—William D. Martin, Jr.
*Attorney, Agent, or Firm*—Oltman and Flynn

[57] ABSTRACT

For adjusting the valves in an automotive, internal combustion, overhead cam engine, a cylindrical calibration shaft with end bushings is mounted in place of the engine camshaft. The radius of this calibration shaft is equal to the minimum cam radius on the engine camshaft. Clearances of the valve tappets from the calibration shaft are determined by feeler guages or by cross pins on the calibration shaft which are slidably adjustable to engage the tappets and then are locked in place on the calibration shaft.

4 Claims, 8 Drawing Figures

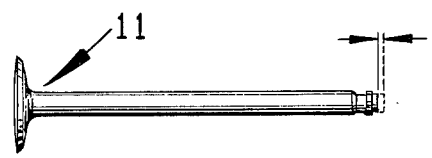
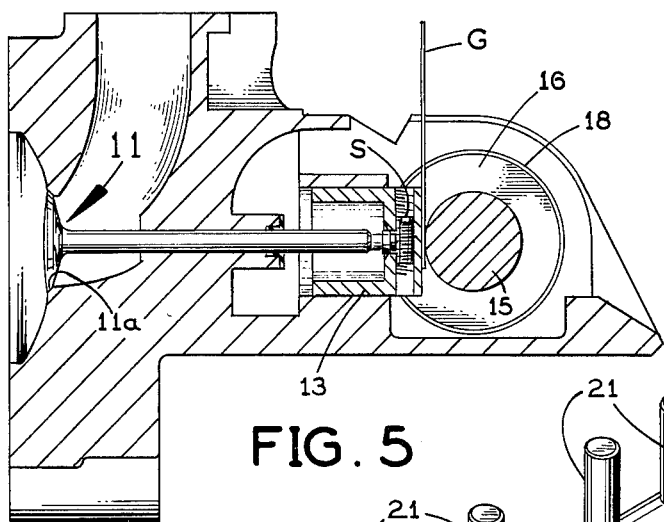
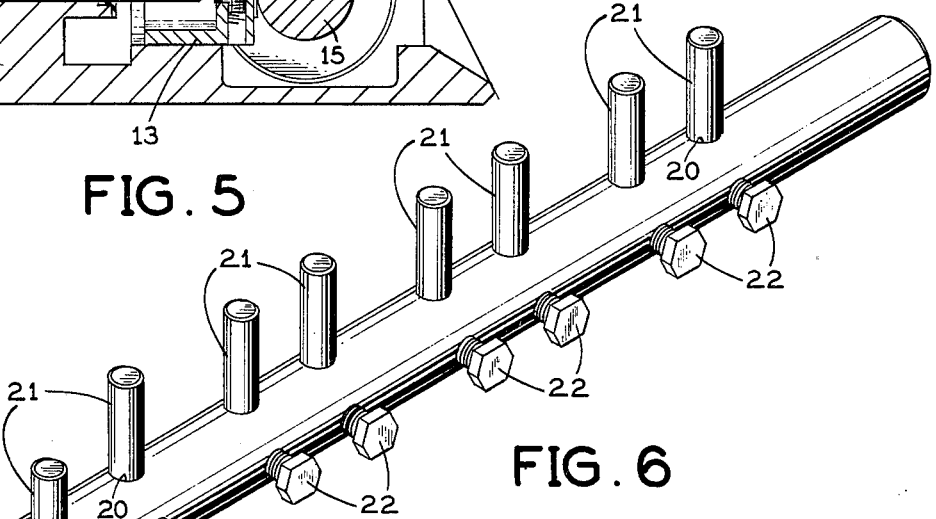
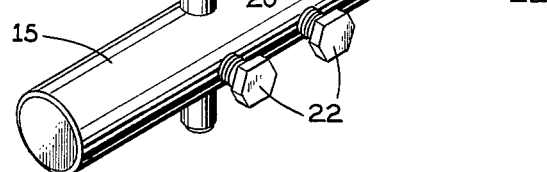
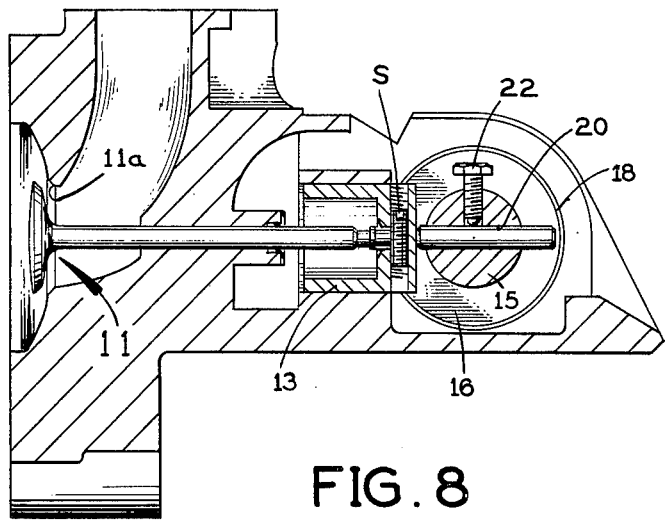
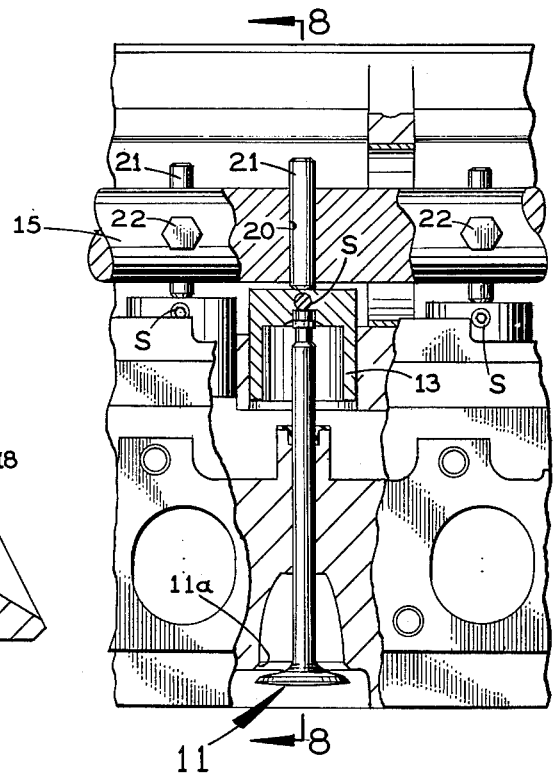

CALIBRATION SHAFT ASSEMBLY FOR ENGINE VALVE ADJUSTMENT

BACKGROUND OF THE INVENTION

In adjusting the intake and exhaust valves on overhead cam engines of certain automobiles, such as the General Motors four-cylinder Vega, the conventional technique used by auto mechanics typically requires repeated removals and reinsertions of the engine camshaft in order to make individual adjustments of the valves. This is time-consuming and expensive.

SUMMARY OF THE INVENTION

The present invention is directed to overcoming the disadvantages and difficulties connected with the adjustment of valves in an overhead cam automotive engine.

In accordance with this invention, the camshaft is replaced by a cylindrical calibration shaft having a radius equal to the minimum radius of each cam on the camshaft and supported with its axis located where the rotational axis of the camshaft would be if the camshaft were in place. End bushings on this calibration shaft are received snugly, but slidably, in the end bearings in the engine which normally support the camshaft. With this calibration shaft mounted in this position, the clearances of the valve tappets can be measured conveniently, one after another, without removing the calibration shaft between successive measurements. Then, after the calibration shaft has been removed, the individual adjustments or, if necessary, replacements, of the valves may be carried out in the usual manner before the engine camshaft is put back in.

A principal object of this invention is to provide a novel and improved arrangement for facilitating the adjustment of valves in an overhead cam engine.

Further objects and advantages of this invention will be apparent from the following detailed description of two presently-preferred embodiments shown in the accompanying drawings, in which:

FIG. 4 is an elevational view of one of the valves in the engine and indicating in phantom where excess length of the valve stem may be removed at the upper end;

FIG. 5 is a vertical section taken along the line 5—5 in FIG. 2 at one of the valves and showing a feeler gauge inserted between the tappet for this valve and the calibration shaft;

FIG. 6 is a perspective view showing a calibration shaft in accordance with a second embodiment of the present invention, but with the end bushings on this shaft removed for simplicity;

FIG. 7 is a fragmentary elevational view of an engine with the FIG. 6 calibration shaft installed in place of the camshaft and with parts broken away to reveal one of the valves in the engine below the calibration shaft;

FIG. 8 is a vertical cross-section taken along the line 8—8 in FIG. 7.

Before explaining the disclosed embodiment of the present invention in detail, it is to be understood that the invention is not limited in its application to the details of the particular arrangements shown, since the invention is capable of other embodiments. Also, the terminology used herein is for the purpose of description and not of limitation.

Figure 2:
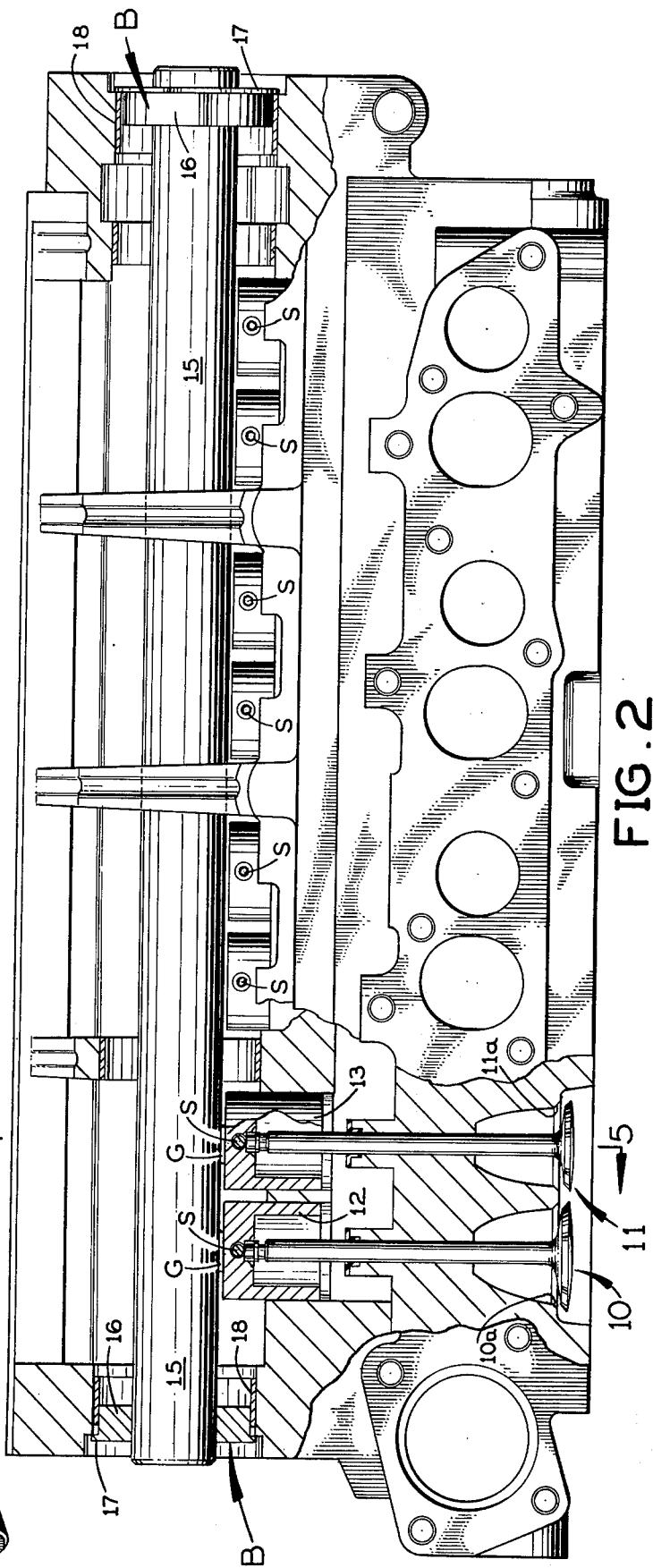
FIG. 2 is a view, partly in longitudinal elevation and partly in vertical section, of an automotive, four-cylinder internal combustion engine having this calibration shaft installed in place of the overhead camshaft to enable determinations of the valve clearances in the engine.

Referring first to FIG. 2, a four-cylinder automotive engine shown there is provided with the usual four pairs of valves 10 and 11, for intake and exhaust, respectively, and having respective inverted cup-shaped tappets 12 and 13 on their upper ends. A known type of tappet adjusting screw S is threadedly received in each tappet and has its tapered inner end engaging the upper end of the valve stem for adjusting the position of the valve with respect to its tappet. The taper of this adjusting screw provides only a limited amount of valve adjustment.

When the engine requires a valve job, first the camshaft must be removed. For adjusting the valves in refacing the cylinder head and the valves or replacing the valve seats, the adjusting screw on one or more valves may not provide enough adjustment to get proper clearance for the corresponding valve. Prior to the present invention, this meant removing the camshaft again so that the valve or cylinder head can be ground to the proper dimension, and then putting the camshaft back in to determine whether the proper clearance has been achieved. In practice, this conventional procedure may require repeated removals and reinsertions of the camshaft before all of the valves are properly adjusted.

These difficulties and disadvantages are overcome by the use of the present invention.

Figure 3:
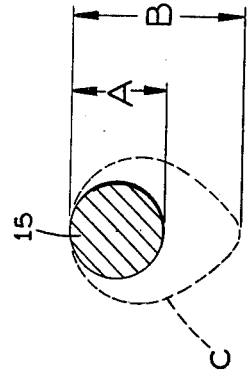
FIG. 3 is a vertical cross-section through the calibration shaft of FIG. 1 and showing in phantom the corresponding cross-section of the engine camshaft.
Figure 1:
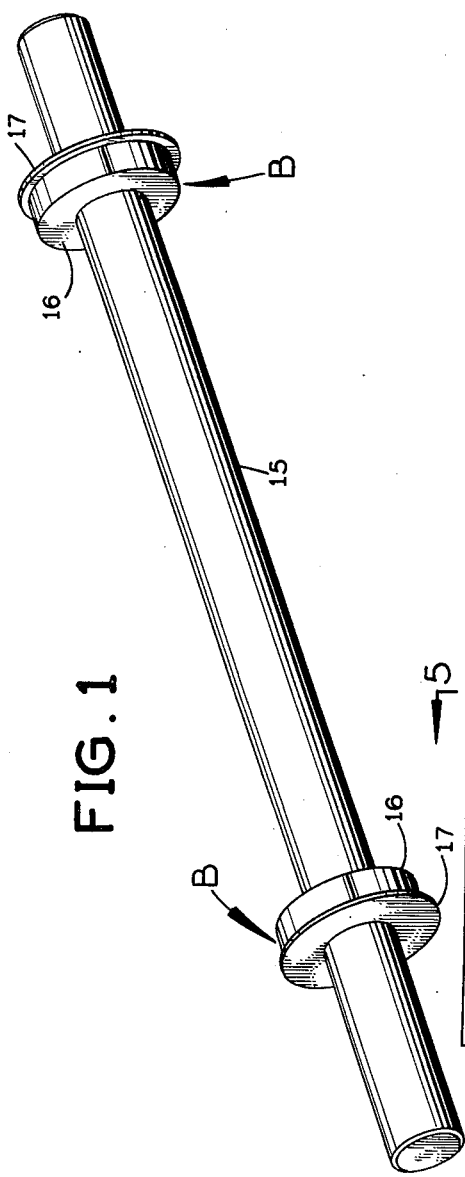
FIG. 1 is a perspective view of a calibration shaft assembly in accordance with a first embodiment of the present invention.

Referring to FIG. 1, in this embodiment the invention comprises a cylindrical, elongated, calibration shaft 15 and bushings B which receive the shaft slidably, but snugly. As indicated in FIG. 3, the radius of the calibration shaft 15 is equal to the smallest radius of the camshaft, shown in phantom in this Figure. Each bushing B has a cylindrical inner end 16 and a radially outwardly-projecting flange 17 on its outer end.

The calibration shaft 15 is installed on the engine in place of the camshaft. The cylindrical inner end of each bushing B for shaft 15 has a snug, slidable fit inside the camshaft bearing 18 at the corresponding end of the engine, and the end flange 17 on each calibration shaft bushing B abuts against the outer end of the camshaft bearing 18, as shown in FIG. 2. Preferably, the calibration shaft 15 is positioned across the top of the valve tappets, as shown, and then the two bushings B are slid onto the calibration shaft from its opposite ends to the positions shown in FIG. 2.

In this position of the parts, the calibration shaft 15 spans the valve tappets 12, 13 for all four cylinders of the engine, and the axis of rotation of shaft 15 coincides with what would be the axis of rotation of the engine camshaft if the latter were in place.

If all of the parts are properly dimensioned, when a valve 10 or 11 is seated against the corresponding valve seat 10a or 11a, the respective tappet 12 or 13 should have a predetemined clearance below the calibration shaft 15. In the case of a Vega four-cylinder engine this clearance is 0.014 to 0.016 inch for intake valves and 0.029 to 0.031 inch for exhaust valves.

With the calibration shaft 15 in place, as shown, this clearance can be determined by inserting a feeler gauge G (FIG. 5) between the calibration shaft and the valve tappet. The size of the feeler gauge which has the best fit between the valve tappet 12 or 13 and the calibration shaft 15 tells the machanic whether the valve can be adjusted within the limits made possible by the adjusting screw S, or whether the valve stem must be shortened or a longer valve provided. If the proper clearance cannot be achieved by turning the tappet adjustment screw S, the valve is removed and either its stem is ground down, if too long, or the entire valve is replaced by a valve with a longer stem, if too short. The calibration shaft 15 enables this determination to be made for every valve in the engine, and only after such determinations have been made does the mechanic remove the calibration shaft 15 and make the necessary adjustments, shortening or replacement of the individual valves.

FIGS. 6–8 show a second embodiment of this invention in which the calibration shaft 15 has a plurality of diametrical openings 20 spaced apart along its length at positions corresponding to the centers of the valve tappets in the engine. Individual cross pins 21 are snugly, but slidably, received in these openings. A set screw 22 is threadedly mounted in the shaft 15 at each of these openings for releasably locking the corresponding pin 21 in place. In this embodiment, as in the first, the shaft has bushings B (not shown in FIG. 16) near its opposite ends which are snugly, but slidably, received in the bearings 18 for the engine camshaft in the manner already shown and described with reference to FIGS. 1 and 2.

With the FIG. 6 calibration shaft 15 spanning all of the engine valve tappets, the set screws 22 are loosened enough to permit the pins 21 to drop down into engagement with the underlying tappets, after which the set screws are tightened and the calibration shaft 15 is removed. The extent to which each pin 21 projects below the calibration shaft 15 tells the clearance of the corresponding valve tappet below shaft 15 when the corresponding valve is closed. This clearance is measured on each pin 21 in any suitable fashion, and from this measurement the mechanic can determine whether replacement of the valve by one with a longer stem, or grinding down of the valve stem, or adjustment of the screw S is the appropriate procedure for providing the desired clearance.

I claim:
1. An apparatus for use in adjusting individual valves in an automotive engine having an overhead camshaft operating directly on tappets for the valves, said apparatus comprising:

a calibration shaft having an elongated cylindrical periphery of a length sufficient to span the engine valve tappets simultaneously, the radius of said calibration shaft being equal to the minimum radius of each cam on the overhead camshaft for the engine;

and two bushings spaced apart along said calibration shaft for supporting said shaft on the engine with its elongated cylindrical periphery spanning the valve tappets;

said calibration shaft having a plurality of diametrical openings therein spaced apart along its length in accordance with the spacings of the valve tappets;

and further comprising a plurality of cross pins slidably received snugly in said openings for adjustment diametrically beyond said openings at the bottom of said calibration shaft;

and means for releasably clamping said pins in place individually in said openings.

2. An apparatus according to claim 1, wherein said last-mentioned means comprise set screws threadedly mounted in said calibration shaft and engageable with said pins to lock the latter in place.

3. An apparatus according to claim 1, wherein each of said bushings has a cylindrical inner end portion shaped and dimensioned for snug, slidable reception in a corresponding camshaft bearing on the engine and a transverse annular flange on its outer end for abutting engagement with the outer end of the corresponding camshaft bearing.

4. An apparatus according to claim 3, wherein each of said bushings has a snug, sliding fit on said calibration shaft.

* * * * *